United States Patent [19]
Fujii et al.

[11] Patent Number: 4,824,266
[45] Date of Patent: Apr. 25, 1989

[54] APPARATUS AND METHOD FOR STORING REGULAR AND IRREGULAR CHARACTERS

[75] Inventors: Kenichi Fujii; Kenmei Tanaka, both of Hyogo, Japan

[73] Assignee: Kanzaki Paper Mgb. Co., Ltd, Japan

[21] Appl. No.: 947,397

[22] Filed: Dec. 29, 1986

[30] Foreign Application Priority Data

Dec. 27, 1985 [JP] Japan ................................ 60-298675
Feb. 8, 1986 [JP] Japan .................................. 61-26596

[51] Int. Cl.⁴ ............................................... B41J 3/20
[52] U.S. Cl. .................................... 400/120; 400/103; 400/121
[58] Field of Search ............... 400/103, 104, 120, 121, 400/306; 101/930.4

[56] References Cited

U.S. PATENT DOCUMENTS

| | | | |
|---|---|---|---|
| 3,893,558 | 7/1975 | Fulton et al. | 400/103 |
| 4,247,207 | 1/1981 | Klimek et al. | 400/121 |
| 4,321,599 | 3/1982 | Yoshiba | 400/306 |
| 4,468,141 | 8/1984 | Rosza | 400/121 |
| 4,704,040 | 11/1987 | Takano et al. | 400/121 |

FOREIGN PATENT DOCUMENTS

| | | | |
|---|---|---|---|
| 160860 | 11/1985 | European Pat. Off. | 400/120 |
| 131577 | 8/1982 | Japan | 400/103 |
| 163585 | 10/1982 | Japan | 400/120 |
| 2077663 | 12/1981 | United Kingdom | 400/103 |

*Primary Examiner*—David A. Wiecking
*Attorney, Agent, or Firm*—Cushman, Darby & Cushman

[57] ABSTRACT

The thermal printer in which an irregular character pattern such a bar code or an OCR (optical character recognizer) character which are different in length and width from the standard font patterns are modified into bit patterns having the same size as that of the standard font patterns. These bit patterns are stored along with restoring data for restoring the bar codes with restoring data for restoring the bar codes and OCR characters to their original pattern for output to a printer. The thermal printer is responsive to a heating element driving pulse signal which is applied once during the data cycle when an ordinary character or graph is printed and twice during data cycle when a bar code is printed. The second pulse per data cycle is selectively applied to the heating element for each irregular character such that the thermal printer is heated to higher temperatures, thereby increasing the diameter of each dot to be printed so that the ruggedness of the contour line of the bar code is minimized.

13 Claims, 6 Drawing Sheets

(PRIOR ART)

FIG. 13(b)

(PRIOR ART)

APPARATUS AND METHOD FOR STORING REGULAR AND IRREGULAR CHARACTERS

BACKGROUND OF THE INVENTION

1. Field of the Invention

This invention relates to a thermal printer for accurately printing bar codes and OCR (optical character recognition) characters as well as ordinary characters.

2. Prior Art

A conventional thermal printer is equipped with a font memory designed to store font patterns having a fixed number of vertical and horizontal dots representing, e.g., em or semi-em characters only. After the font pattern is read out of the memory, a between-line dot train is added between the font patterns so that the font pattern may be supplied to the printer as a dot pattern. Accordingly, the printer is used for printing ordinary characters only, and bar codes or irregular characters such as OCR characters which have widths different from that of ordinary characters cannot be printed. Consequently, the conventional thermal printer is incapable of printing a label including irregular characters in addition to ordinary ones.

Figure 13A:
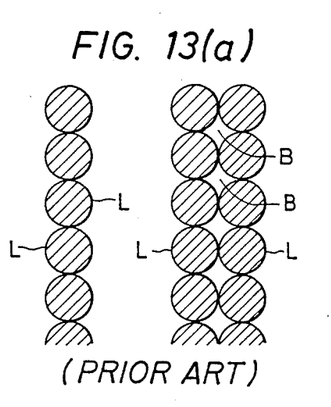
FIG. 13a is a diagram showing a conventional bar code printing pattern.

In addition, bar codes pose special problems for thermal printers, for when a thermal printer is used to print a bar code, the contour line L as shown in FIG. 13a, of the bar code becomes extremely rugged, because each dot printed is close to the range of a circle and produces a decolorized portion B within a thick bar of the bar code. Thus, the accuracy of the bar printed by a thermal printer and detected by a bar code reader is substantially lower than the accuracy of a bar printed by a special bar code printer.

OBJECTS AND SUMMARY OF THE INVENTION

An object of the present invention is to provide a printer capable of preparing a label including an irregular character, such as a bar code or OCR character, which can be optically read out with high accuracy along with a sentence comprising ordinary characters.

Another object of the present invention is to provide a printer capable of printing a bar code without decolorized portions and with a linear edge than can be detected accurately by a bar code reader.

In the thermal printer according to the present invention, irregular character data such as bar codes and OCR (Optical Character Recognizer) characters which are different in length and width from standard font patterns are modified into bit patterns having the same size as that of the standard font patterns. These bit patterns are stored along with restoring data for restoring the bar codes and OCR characters to their original patterns in an output memory. When the bit patterns are read out, the bit patterns are combined so as to restore the original irregular character pattern in accordance with the restoring data. The bit pattern is then supplied to the printer as an arbitrary dot pattern.

The number of transverse dots needed to represent a bar code or OCR character differs from character to character, and if such irregular characters are stored in the font memory without modification, the software for storing and reading the character becomes complicated and time-consuming. However, if such an irregular character is stored using a font pattern with the same standard as that of an ordinary character, the interval between characters will exceed the prescribed value and form a blank dot train because the width of the irregular character for printing may be narrower than that of the ordinary character. In addition, when an irregular character which has a width which is a non-integral multiple of the width of font pattern areas, the memory space is uneconomically employed, and because there is still an excessive blank, the space between characters cannot be set at the prescribed value.

Consequently, in the present invention a modified irregular character pattern is stored in a portion of an area equivalent to one ordinary character in the font memory, and restoring data for restoring the pattern to the original character pattern is written into the other portion of the same area. The font pattern is then read out once and restored using the restoring data, and by removing the unnecessary dot train, the irregular character dot train is compressed and edited according to the prescribed standard before being supplied to the graphic printer corresponding to the bit dots. By thus treating the irregular character in the same manner as an ordinary character, the operating speed is not decreased, and the irregular characters are readily printed.

In order to accurately print the restored irregular character pattern including the bar codes, the thermal printer according to the present invention is arranged such that a heating element driving pulse signal is applied once during the data cycle when an ordinary character or graph is printed and twice during the data cycle when a bar code is printed. The diameter of each dot to be printed is enlarged because the heating element of the thermal printer is heated to higher temperatures by selectively applying the two pulses to the heating element for each irregular character. Thus, since the diameter of each dot to be printed is enlarged, the ruggedness of the contour line of the bar code is minimized and made as linear as possible. Furthermore, the decolorized portion within the contour is made less conspicuous or completely nullified by the larger dot.

BRIEF DESCRIPTION OF THE DRAWINGS

FIG. 4a is a diagram showing a bar code dot pattern restored from the pattern shown in FIG. 3;

FIG. 4b is a diagram showing an extended version of the bar code dot pattern of FIG. 4a;

FIG. 11b is a diagram showing an enlarged portion of the pattern of FIG. 11a;

FIG. 13b is a diagram showing an enlarged portion of the pattern of FIG. 13a.

DETAILED DESCRIPTION OF THE PREFERRED EMBODIMENT

Figure 1:
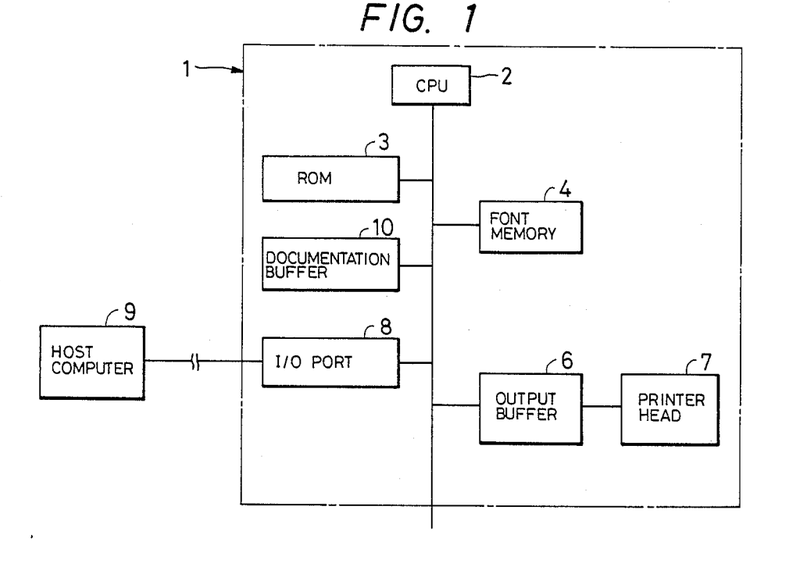
FIG. 1 is a block diagram showing an embodiment of the present invention.

FIG. 1 shows an embodiment of the thermal printer 1 of the present invention. Thermal printer 1 is used as a label printer and comprises a CPU 2, a ROM 3 containing a control program, a font memory 4 for storing characters and alphanumeric patterns, an output buffer 6 for storing print patterns obtained by editing the font patterns read out of the font memory, a thermal transfer type line dot printer head 7 driven by a signal from the output buffer 6, a documentation buffer 10 for incorporating documentation data supplied, and an I/O port 8 for connecting the above-described elements to a host computer 9.

Figure 2:
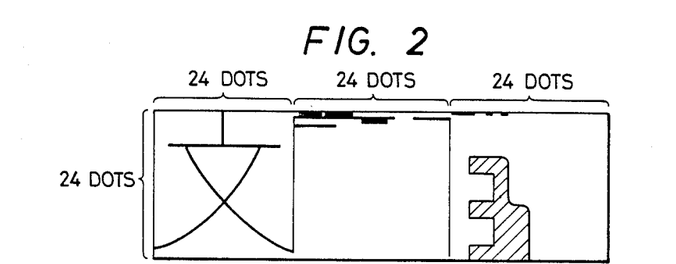
FIG. 2 is a diagram showing part of a font memory.
Figure 3:
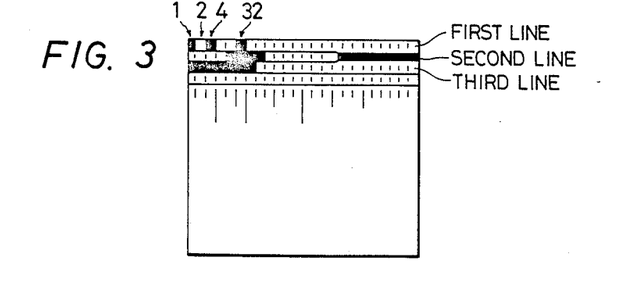
FIG. 3 is a diagram showing a stored bar code pattern in the font memory.

FIG. 2 shows a portion of the font memory 4 wherein each of the ordinary characters or irregular characters, e.g., bar codes, are stored such that one character occupies an area of 24×24 bits. In this embodiment, the width of one bar code is assumed to be wider than that of an ordinary character (24 dots), and is, therefore, applicable to a large bar code being stuck onto cargo being shipped. For example, a bar code is shown in FIG. 3 in which 37 dots in the font memory correspond to the width of one character. As shown, the bar code dot pattern is written in over two lines in the second and following lines.

Figure 4:
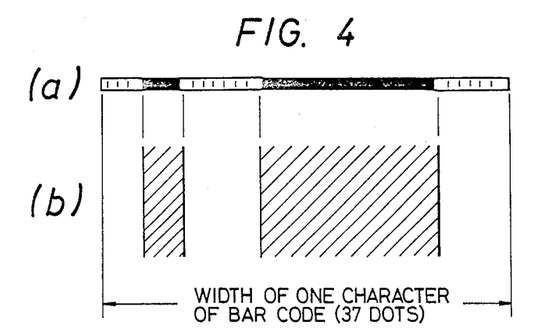

FIG. 4a shows an expanded view of the restored dot pattern from FIG. 3, wherein the 24 bits from the second line and 13 bits from the third line are lined up. The repetition of the dot pattern in the memory in the downward direction of FIG. 3 allows for the formation of a bar code as shown in FIG. 4b. Since the actual read-out is obtained from the font memory one byte (8 bits) by one byte (8 bits), portions equivalent to 5 bytes in the above example are read out, and 3 bits in the last portion are discarded (5 bytes=40 bits; 40 bits−37 bits=3 bits).

Figure 5:
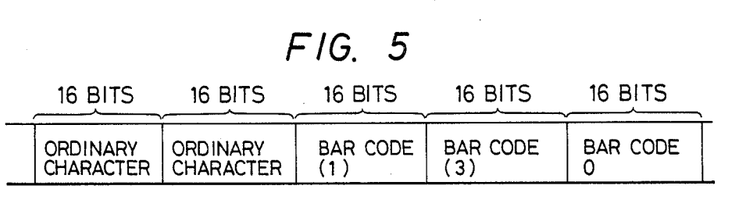
FIG. 5 is a diagram showing an example of the contents of the documentation buffer.
Figure 6:
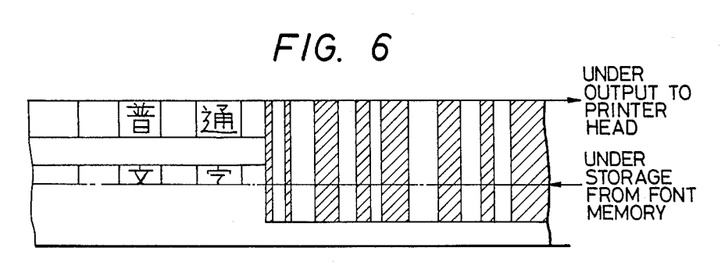
FIG. 6 is a diagram showing part of the contents of the output buffer.

All characters and symbols are given 4-digit number codes, and when documentation data in the form of a signal train containing data formatted with 16 bits per character is outputted from the host computer 9 as shown in FIG. 5, the CPU 2 first writes the signal train into the documentation buffer 10 and then reads the data successively in order to take the font pattern data corresponding to the character code out of the font memory 4. The character train font pattern equivalent to one line based on the format data is then edited and stored in the output buffer 6. FIG. 6 shows part of the inside of the output buffer, wherein it is shown how the data is represented within the buffer.

Figure 7:
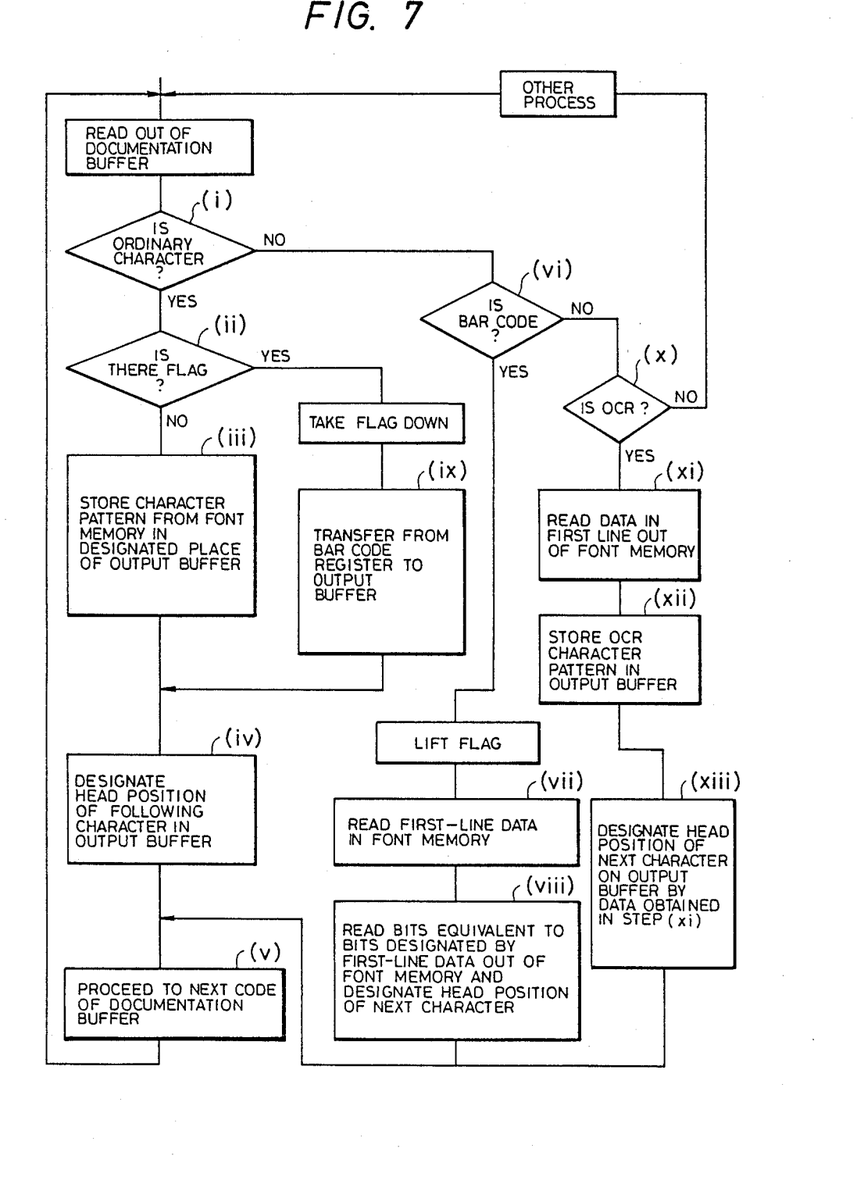
FIG. 7 is a flowchart explanatory of the operation of an embodiment of the present invention.

FIG. 7 is a flowchart of the process used by the CPU 2 for forming a print pattern equivalent to one document line by editing the documentation data incorporated in the documentation buffer 10. A code number is allotted to each character, and since the contents of the documentation buffer consist of the code number trains, irregular characters such as bar codes and OCR characters can be identified by the code numbers. After the documentation buffer is read out, it is determined at step (i) whether the code read out of the documentation buffer designates an ordinary character or not, and if it is an ordinary character, at step (ii) it is determined whether a flag is set, as will be described later. If the flag is not set, at step (iii) the character pattern corresponding to the designated code is read out of the memory 4 and stored in the designated place of the output buffer 6. When the received character pattern designates a information on a first dot row to be printed, its storage place in the output buffer is designated by blank data in the format, but when a pattern equivalent to one character is stored in the output buffer, the head position of the following character in the output buffer is designated by the format data at step (iv). The documentation buffer pointer is then moved to the next code at step (v), and operation is then returned to the beginning to read the next code from the documentation buffer.

When a bar code is received, it is determined at step (i) that the code does not designate an ordinary character, so control is passed to step (vi). At step (vi), the code is recognized as a bar code, and the bar code flag is set before the first line of data in the designated area of the font memory is read out at step (vii). Data ranging from the second to third lines is then read out as designated by the first-line of data and is stored in a bar code portion of font memory 4 at step (viii). The bar code dot pattern read out is not immediately stored in the output buffer 6 on the assumption that ordinary character and bar code portions may both exist within the same line of the document. The bar code dot pattern read out of the font memory may be stored in the output buffer immediately, however, provided that no character of any other type is included in the line having a bar code. The head position of the next character in the bar code portion is then designated, and at step (v), the documentation buffer pointer is advanced to the next character. Operation is then returned to the beginning to read the next code from the documentation buffer.

The above operation is repeatedly performed on the bar code train, and when the last character of the bar code bit pattern has been read out of the font memory 4 at step (viii), during the next iteration of the loop at step (i) it is determined that an ordinary character is present. Control then proceeds to step (ii) as described above. At step (ii), it is determined that the bar code flag has been set; therefore, operation proceeds to step (ix) to clear the flag. Then at step (ix) the dot pattern of the bar code is repeated up to the length of the bar code, and the output is transferred to the output buffer 6. Operation is then returned to the reading of the documentation buffer via steps (iv) and (v) as described above. The ordinary character operation is then conducted by steps (i)-(v), as described above until operation for one line is terminated.

Since the length of a bar code extends over a plurality of ordinary document lines, the above operation is carried out for the first line including the bar code. However, if a new line or a space symbol designating the bar code is inserted in the second and the following lines, the documentation buffer assumes that a portion equivalent to the bar code is skipped in the output buffer in step (iv) so as to designate the head position of the next character.

When the data read out of the documentation buffer is an OCR character narrower than the ordinary character, at steps (i) and (vi) negative responses are received so that control proceeds to step (x). At step (x) it is determined whether the received code designates an OCR character, and if not, control proceeds to another process before reading in the next code from the documentation buffer. If an OCR character is present, the data in the first line of memory is read out of the designated area of the font memory at step (xi). Since the data in the first line indicates the number of dots corresponding to the width of the OCR character, the OCR character pattern can be stored in the same manner as the ordinary character and is read out and stored at step (xii) in the designated area of the output buffer. The head position of the next character in the output buffer is then designated at step (xiii) by the data obtained in Step (xi), and the operation is returned through step (v) to read the next code from the documentation buffer.

To modify the irregular character pattern, the dot pattern across the bar code is continued on the following line of memory. In this manner, the bar code can be stored in an area equivalent to that of an ordinary character in the font memory 4, and the left-over space is left unprocessed. In the case of an OCR character, on the other hand, a blank space is added to the OCR pattern and is stored along with the OCR character data as an ordinary character. Thus, the data for restoring the irregular character may be stored with the modified irregular character pattern such that the irregular character conforms to the standards for ordinary characters.

Figure 8:
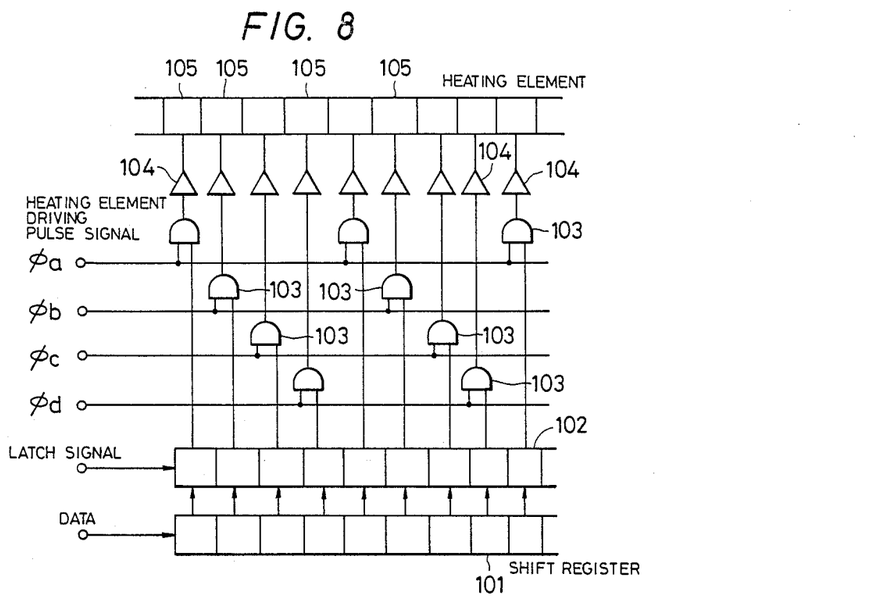
FIG. 8 is a circuit diagram showing a heating element driver for a thermal printer in accordance with the present invention.

The edges of the bar code print may be improved by the printer head 7 in the embodiment of FIG. 1, shown in more detail in FIG. 8. FIG. 8 shows a heating element driving circuit which receives dot pattern data from output buffer 6. The dot pattern data is sent through a shift register 101 to a latch circuit 102 by a latch signal, and the output of the latch circuit 102 is applied to each heating element 105 through the corresponding gate 103 and amplifier 104. A heating element driving pulse signal is divided into phases $\phi a$, $\phi b$, $\phi c$, and $\phi d$ to be applied to each gate 103 in order to minimize power usage for driving the heating element and to prevent the adjacent heating elements from interfering with each other.

Figure 9:
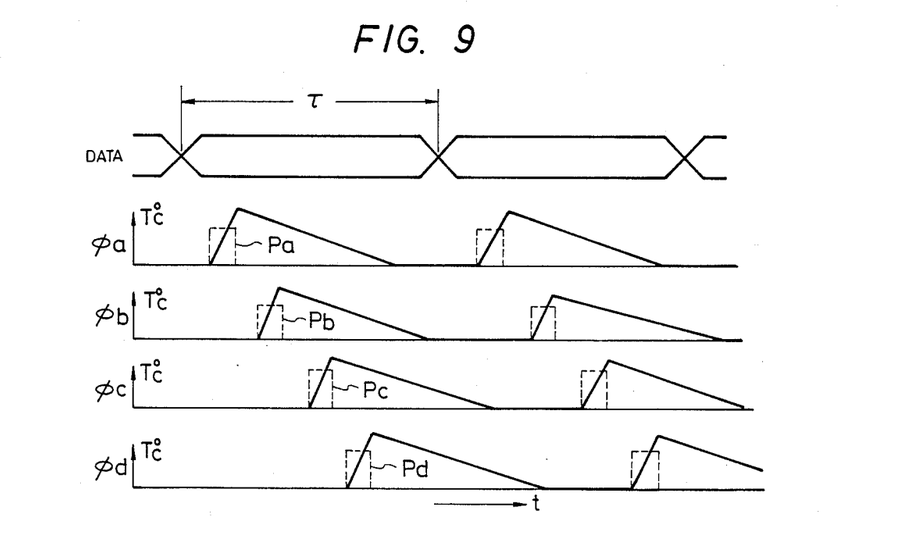
FIG. 9 is a diagram explanatory of the operation of the printer when an ordinary character or graph is printed.
Figure 13B:
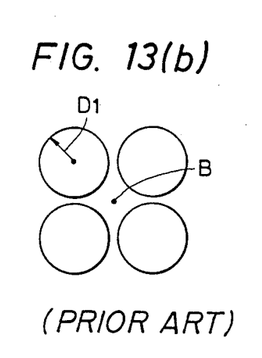

FIG. 9 illustrates the operation of each element of FIG. 8 when an ordinary character or graph is printed, wherein pulses Pa, Pb, Pc and Pd are respectively applied to the heating elements 105 during the data cycle such that the temperature T of the heating element sharply rises during the pulse period and relatively slowly drops after the pulse period. Each dot thus printed then forms, as shown in FIG. 13b, an independent circle without overlapping.

Figure 10:
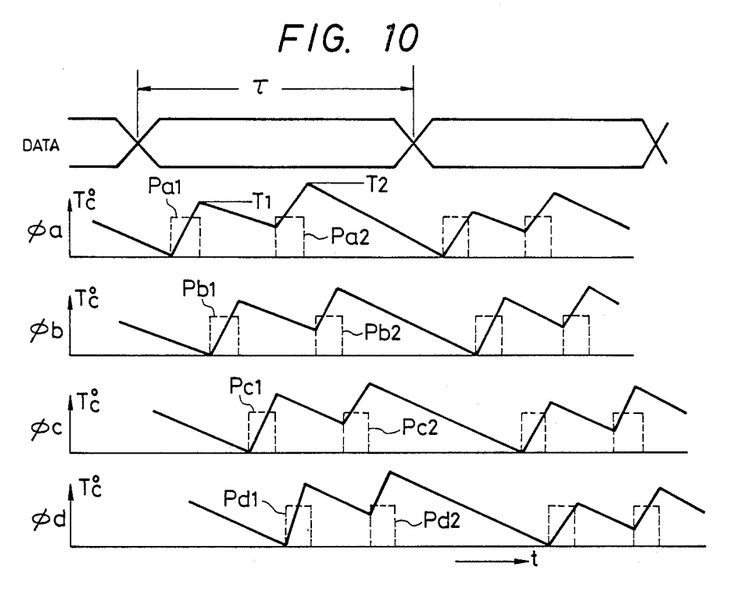
FIG. 10 is a diagram explanatory of the operation of the printer when a bar code is printed.

FIG. 10 shows the operation of each element of FIG. 8 when a bar code is printed, wherein two heating element driving pulse signals $Pa_1$ and $Pa_2$ are respectively applied during the data cycle $\tau$ when the driving pulse signal $\phi a$ is applied, $Pb_1$ and $Pb_2$ are respectively applied when driving pulse $\phi b$ is applied; and so forth. As shown in FIG. 10, since the second pulse is applied before the temperature due to the first pulse has not completely dropped, a temperature $T_2$ higher than $T_1$ of the first pulse is reached. The higher temperature results in a larger dot being printed by the heating elements 105. The temperature $T_2$ may be adjusted by properly setting the interval between the two pulses $Pa_1$ and $Pa_2$.

Figure 11A:
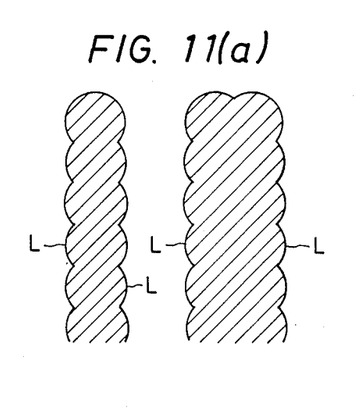
FIG. 11a is a diagram showing a bar code printing pattern in accordance with the present invention.
Figure 11B:
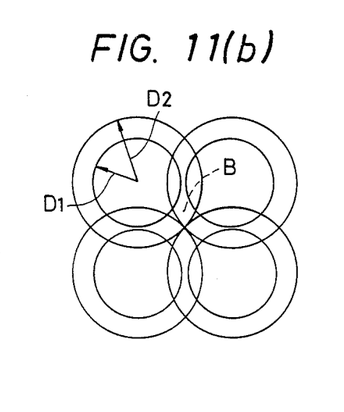

The bar code thus printed is, as shown in FIG. 11a, less rugged than the conventional contour line L of FIG. 13a. FIG. 11b is an enlarged version of FIG. 11a showing that when the radius $D_2$ is about 1.4 times greater than $D_1$, the diamond decolorized portion B is not present which appears in the conventional contour line as shown by B in FIG. 13b. Thus, by increasing the dot size, the contour line is less rugged, thereby appearing more as a straight line, and the undesirable decolorized portions are effectively eliminated.

Figure 12:
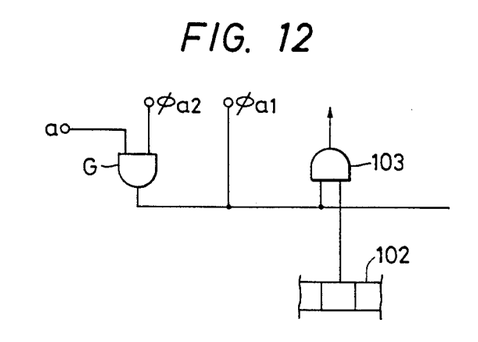
FIG. 12 is a circuit diagram of a heating element driving pulse switching circuit.

FIG. 12 represents a circuit configuration for switching between the application of one or two heating element driving pulses during the data cycle. A control circuit (not shown) outputs heating element driving pulses $\phi a_2$, $\phi b_2$, $\phi c_2$, and $\phi d_2$ and the heating element driving pulses $\phi a_1$, $\phi b_1$, $\phi c_1$, and $\phi d_1$, the latter having the same period as that of the former but being time delayed by a fixed amount. Although FIG. 12 shows the $\phi a$ phase, the same circuit configuration is used for the others.

The gate G is closed when an ordinary character or graph is printed, thereby only applying $\phi a_1$ to the gate 103 as in the embodiment of FIG. 8. However, when a signal indicating that a bar code is being printed is applied by the control circuit to the terminal a, the gate G is opened and both the pulses $\phi a_1$, and $\phi a_2$ are applied to the gate 103 during each data cycle.

The total line containing a bar code is subjected to two pulses per data cycle printing when a document contains both an ordinary character or graph and the bar code according to the above embodiment, but when the dot train is divided into several blocks on the same line, only the block including the bar code should be subjected to two pulses per data cycle printing.

We claim:

1. A line-head type thermal printer, comprising:
  a font memory means for storing font patterns having a predetermined number of transverse dots from a source of standard font patterns having a number of transverse dots corresponding to predetermined number of transverse dots and from a source irregular font patterns having a number of transverse dots different from said predetermined number of transverse dots, said means for storing including means for representing said irregular font patterns as at least one bit pattern having said predetermined number of transverse dots and restoring data for restoring said irregular font pattern from said at least one bit pattern having said predetermined number of transverse dots;
  an output buffer for storing standard and irregular font patterns to be printed; and
  a thermal printer head for printing said standard font patterns and said irregular font patterns stored in said output buffer.

2. A thermal printer as claimed in claim 1, wherein said irregular font patterns represent optical character recognition.

3. A line-head type thermal printer comprising:
  a font memory means for storing font patterns having a predetermined number of transverse dots from a source of standard font patterns having a number of transverse dots corresponding to predetermined number of transverse dots and from a source irregular font patterns having a number of transverse dots different from said predetermined number of transverse dots, said means for storing including means for representing said irregular font patterns as at least one bit pattern having said predetermined number of transverse dots and restoring data for restoring said irregular font pattern from said at least one bit pattern having said predetermined number of transverse dots;
  an output buffer for storing standard and irregular font patterns to be printed;

a thermal printer head for printing said standard font patterns and said irregular font patterns stored in said output buffer; and means for generating first and second heating element driving pulse signals and wherein said thermal printer head includes heating elements driven by said first and second heating element driving pulse signals during each data cycle when said irregular font patterns are being printed, but only said first pulse signal being applied to said heating elements during each data cycle when said standard font patterns are being printed.

4. A thermal printer as claimed in claim 3, wherein said irregular font patterns represent bar codes.

5. A thermal printer as claimed in claim 3, wherein said thermal printer head further includes switching means responsive to a control signal for disabling a second heating element driving pulse signal when said standard font patterns are being printed.

6. A thermal printer as claimed in claim 3, wherein said first and second heating element driving pulse signals cause said heating elements to reach a temperature when said irregular font patterns are being printed which is greater than a temperature reached by said heating elements when only said first heating element driving pulse signal is applied.

7. A method of printing standard and irregular font patterns with a line-head type thermal printer containing a font memory for storing font patterns having a predetermined number of transverse dots, the standard font patterns having a number of transverse dots corresponding to said predetermined number of transverse dots and said irregular font patterns having a number of transverse dots different from said predetermined number of transverse dots, comprising the steps of:

storing patterns input from a source of standard and irregular font patterns in said font memory, including representing each irregular font pattern as at least one bit pattern having said predetermined number of transverse dots and restoring data for restoring said irregular font pattern from said at least one bit pattern having said predetermined number of transverse dots;

inputting standard and irregular font patterns to be printed;

restoring said inputted irregular font patterns from said bit patterns having said predetermined number of transverse dots; and printing said inputted standard font patterns and said restored irregular patterns with a thermal printer head.

8. A method in accordance with claim 7, wherein said irregular font patterns represent optical character recognizer characters.

9. A method in accordance with claim 7, wherein said restoring step includes the step of sequentially reading said bit patterns having said predetermined number of transverse dots and said restoring data.

10. A method of printing standard and irregular font patterns with a line-head type thermal printer containing a font memory for storing font patterns having a predetermined number of transverse dots, the standard font patterns having a number of transverse dots corresponding to said predetermined number of transverse dots and said irregular font patterns having a number of transverse dots different from said predetermined number of transverse dots, comprising the steps of:

storing patterns input from a source of standard and irregular font patterns in said font memory, including representing each irregular font pattern as at least one bit pattern having said predetermined number of transverse dots and restoring data for restoring said irregular font pattern from said at least one bit pattern having said predetermined number of transverse dots;

inputting standard and irregular font patterns to be printed;

restoring said inputted irregular font patterns from said bit patterns having said predetermined number of transverse dots; and printing said inputted standard font patterns and said restored irregular patterns with a thermal printer head, said printing step including the step of applying first and second heating element driving pulse signals to heating elements of said thermal printer head during each data cycle when said irregular font patterns are being printed, but only said first pulse signal being applied when said standard font patterns are being printed.

11. A method in accordance with claim 10, wherein said irregular font patterns represent bar codes.

12. A method in accordance with claim 10, wherein said applying step includes generating a control signal when said standard font patterns are being printed and disabling said second heating element driving pulse signal in response to said control signal.

13. A method in accordance with claim 10, wherein said first and second pulse signals are applied to said heating elements so as to cause a second temperature of said heating elements greater than a first temperature caused by only said first pulse signal.

* * * * *